US008443604B2

(12) United States Patent
Yung (10) Patent No.: US 8,443,604 B2
(45) Date of Patent: May 21, 2013

(54) MEMORY ALLOY SPRING ENGINE

(76) Inventor: Waikeung Yung, Hong Kong (HK)

( * ) Notice: Subject to any disclaimer, the term of this patent is extended or adjusted under 35 U.S.C. 154(b) by 850 days.

(21) Appl. No.: 12/601,264

(22) PCT Filed: Jul. 24, 2008

(86) PCT No.: PCT/CN2008/001360
§ 371 (c)(1),
(2), (4) Date: Nov. 22, 2009

(87) PCT Pub. No.: WO2009/012657
PCT Pub. Date: Jan. 29, 2009

(65) Prior Publication Data
US 2010/0162698 A1   Jul. 1, 2010

(30) Foreign Application Priority Data

Jul. 25, 2007 (CN) .......................... 2007 1 0075324

(51) Int. Cl.
*B60K 16/00* (2006.01)
*F01B 29/10* (2006.01)

(52) U.S. Cl.
USPC ........................................... 60/641.8; 60/529

(58) Field of Classification Search
USPC ........................................ 60/641.8, 527–529
See application file for complete search history.

(56) References Cited

U.S. PATENT DOCUMENTS

| 4,325,217 A * | 4/1982 | Golestaneh ....................... 60/527 |
| 4,955,196 A * | 9/1990 | Lin et al. ............................ 60/527 |
| 4,984,542 A | 1/1991 | Rische et al. |
| 7,299,630 B2 * | 11/2007 | Browne et al. .................... 60/527 |

FOREIGN PATENT DOCUMENTS

| CN | 2179934 | 10/1994 |
| CN | 1718289 | 1/2006 |
| CN | 1831448 | 9/2006 |
| JP | 6483988 | 3/1989 |
| JP | 7167037 | 7/1995 |

OTHER PUBLICATIONS

First Office Action issued for Chinese Patent Application No. 200880014562.4.
International Search Report for PCT Patent Application No. PCT/CN2008/001360.

* cited by examiner

*Primary Examiner* — Hoang Nguyen
(74) *Attorney, Agent, or Firm* — Rabin & Berdo, P.C.

(57) ABSTRACT

A memory alloy spring engine includes a spring (1) made from a memory alloy, a driving stem (6) and a heat resource. The memory spring (1) is connected to the driving stem (6) and configured to move the driving stem (6) when being compressed and deformed by an external force, to restore to an original shape after being compressed and then heated, and to move the driving stem (6) again after being cooled and then compressed and deformed again so as to move the driving stem (6) up and down along therewith in continuous repeating cycles. The memory spring is equipped with a polyhedral glass ball (3), the polyhedral glass ball (3) is configured to collect sunlight from different angles and to conduct solar heat to the memory spring (1) so that the memory spring is heated and thereby restored to the original shape. The engine may utilize natural heat energy (solar energy or geo-heat) and combustible fuel alone or in combination to generate electricity according to different locations or different times.

5 Claims, 9 Drawing Sheets

MEMORY ALLOY SPRING ENGINE

FIELD OF THE PATENT APPLICATION

The present invention relates to a spring engine, and more particularly to a memory alloy spring engine that utilizes memory metal spring to generate power.

BACKGROUND

For a long time, electricity has been generated by burning fuels to expand air and exhausting the air so as to drive a piston to move forth and back or drive an impeller to rotate, and thereby to push a turbine generator to rotate. The method is effective, but is dependent on the supply of combustible materials. With the presence of global energy shortage, continuing in using this method will be troublesome.

SUMMARY

The object of the present patent application is to provide a memory alloy spring engine that adopts memory alloy springs to avoid dependence on combustible materials and is powered by natural heat energy (e.g. solar heat or geo-heat) solely or partially.

A memory alloy spring engine includes a spring made from a memory alloy, a driving stem and a heat resource. The memory spring is connected to the driving stem and configured to move the driving stem when being compressed and deformed by an external force, to restore to an original shape after being compressed and then heated, and to move the driving stem again after being cooled and then compressed and deformed again so as to move the driving stem up and down along therewith in continuous repeating cycles.

The technical solution further includes:

The memory spring is equipped with a polyhedral glass ball. The polyhedral glass ball is configured to collect sunlight from different angles and to conduct solar heat to the memory spring so that the memory spring is heated and thereby restored to the original shape.

The memory spring is equipped with a fuel burning device. The fuel burning device is configured to conduct burning heat to the memory spring so that the memory spring is heated and thereby restored to the original shape.

The memory spring is equipped with an electrical energy conversion device. The electrical energy conversion device is configured to convert electrical energy into heat energy and conduct heat energy to the memory spring so that the memory spring is heated and thereby restored to the original shape.

The memory spring is equipped with a geo-heat collection and storage device. The geo-heat collection and storage device is configured to conduct geo-heat to the memory spring so that the memory spring is heated and thereby restored to the original shape.

The memory alloy spring engine includes a memory spring made from nickel titanium alloy memory metal, wherein a weight is disposed on the memory spring and provided with the driving stem, and the memory spring is connected with a polyhedral glass ball through a heat-conducting rod, the weight being configured to compress and deform the memory spring by the weight thereof, the polyhedral glass ball being configured to conduct heat to the memory spring so that the memory spring is heated to restore the original shape thereof and push the driving stem upwards, the weight being configured to compress the memory spring again after the memory spring is cooled so as to continuously move the driving stem up and down in repeating cycles, the driving stem being configured to rotate a gear set through a pivoted lever, the gear set being configured to turn a copper sheet to cut the magnetic lines of force of a magnet with a conducting wire and thereby generate an output current.

The memory alloy spring engine includes a memory spring made from nickel titanium alloy memory metal, wherein a weight is disposed on the memory spring and provided with the driving stem, and a steel ball tray is disposed at the top of the driving stem, the steel ball tray being configured to support and pass a steel ball, the memory spring being connected with a polyhedral glass ball through a heat-conducting rod, the weight being configured to compress and deform the memory spring by the weight thereof so that the steel ball falls into the steel ball tray at the top of the driving stem, the polyhedral glass ball being configured to conduct heat to the memory spring so that the memory spring is heated to restore the original shape thereof and push the driving stem upwards so that the steel ball in the steel ball tray at the top of the driving stem falls into a ball entrance pipe and falls out from another end of the ball entrance pipe and into another steel ball tray, another steel ball tray being configured to pull a chain belt under the weight of the steel ball, the chain belt being disposed in a positioning pipe and connected with a tension spring and including a gear in a middle portion thereof, the gear being disposed in the middle of a revolving track ring, configured to revolve and rotate along the revolving track ring, and connected with a bearing rod, another end of the bearing being configured to turn a copper sheet to cut the magnetic lines of force of a magnet with a conducting wire and thereby generate an output current.

The memory alloy spring engine further includes a heat-insulating box covered at the outside, wherein the periphery of the heat-insulating box is provided with movable blinds, the top of the heat-insulating box is provided with a movable box cover formed by cone sheets, and the heat-insulating box is glued with heat-resistant tiles that includes amorphous silicon reinforced fibers and high-temperature ceramic coating.

The memory alloy spring engine further includes a heater that is connected with a timer, the heater being a fuel tank, an electric furnace or a geothermal reservoir, a burner nozzle or a heat-conducting cylinder of the heater being connected with a heat-conducting rod of the heater, the timer being disposed above the heater and configure to start counting when the timer is contacted by the driving stem and to stop counting when the timer is separated from the driving stem, a push stem of the timer being configured to downwardly push a switch of the heater at a predetermined timing so that the heater heats the heat-conducting rod through the burner nozzle or the heat-conducting cylinder.

The present patent application has the following advantages: the engine may utilize natural heat energy (solar energy or geo-heat) and combustible fuel alone or in combination to generate electricity according to different locations or different times.

In the above figures: 1 memory springs, 2 weight plates, 3 polyhedral glass balls, 4 metal rods, 5 heat-conducting rods, 6 driving stem, 7 heat-insulating box, 8 blinds, 9 cone sheets, 10 heater, 11 burner nozzles or heat-conducting cylinders, 12 timer, 13 timer switch, 14 timer driving stem, 15 heater switch, 16 connecting rod, 17 steel ball, 18 steel ball tray, 19 ball-entering pipe, 20 copper sheet, 21 chain belt, 22 tension spring, 23 positioning pipe, 24 chain belt gear, 25 revolving track ring, 26 bearing rod, 27 ball-returning pipe, 28 pivoted lever, 29 gear, 30 magnet, and 31 copper wire.

DETAILED DESCRIPTION

Further description will now be made in detail to the present patent application in combination with the figures:

As shown in the figures, the engine utilizes the memory metal springs as a power source. Any metal material that can be formed into a memory metal, such as nickel titanium alloy, can be used to form the shape of the springs. The springs are downwardly compressed by the gravity of an iron plate or multiple weights applied thereon, heated to bounce upward and return to their original shapes after being compressed, and then compressed again by the iron plate or the weights thereon after being cooled so as to move a driving stem up and down in continuous repeating cycles and thereby drive other machines to rotate or to move. The methods for heating the memory metal springs include: 1. the memory springs are heated by polyhedral glass balls, which collect sunshine at different angles and conduct heat to the memory springs through a heat-conducting rod; 2. the memory springs are heated by burning fuels and conducting the heat thereto through a heat-conducting rod; 3. the memory springs are heated by generating heat by electrical power and conducting heat thereto by a heat-conducting rod; 4. the memory springs are heated by collecting geo-heat from underground and conducting the geo-heat thereto through a heat-conducting rod; and 5. the memory springs are heated by generating heat by other means and conducting the heat thereto through a heat-conducting rod. A housing of the engine is a heat-insulating box. When the springs return to the original shapes and thereby push the iron plates or the weight upwards, blinds at four edges of the heat-insulating box are simultaneously lifted up so as to close the heat-insulating box. When the springs are pushed downwards by the iron plate or the weights, blinds at four edges of the heat-insulating box are simultaneously lowered so as to open the heat-insulating box. The heat-insulating box may be glued with heat-insulating tiles that are made of amorphous silicon reinforced fiber and high-temperature ceramic coating or any other materials so as to enhance its heat-insulating capability.

Figure 1:
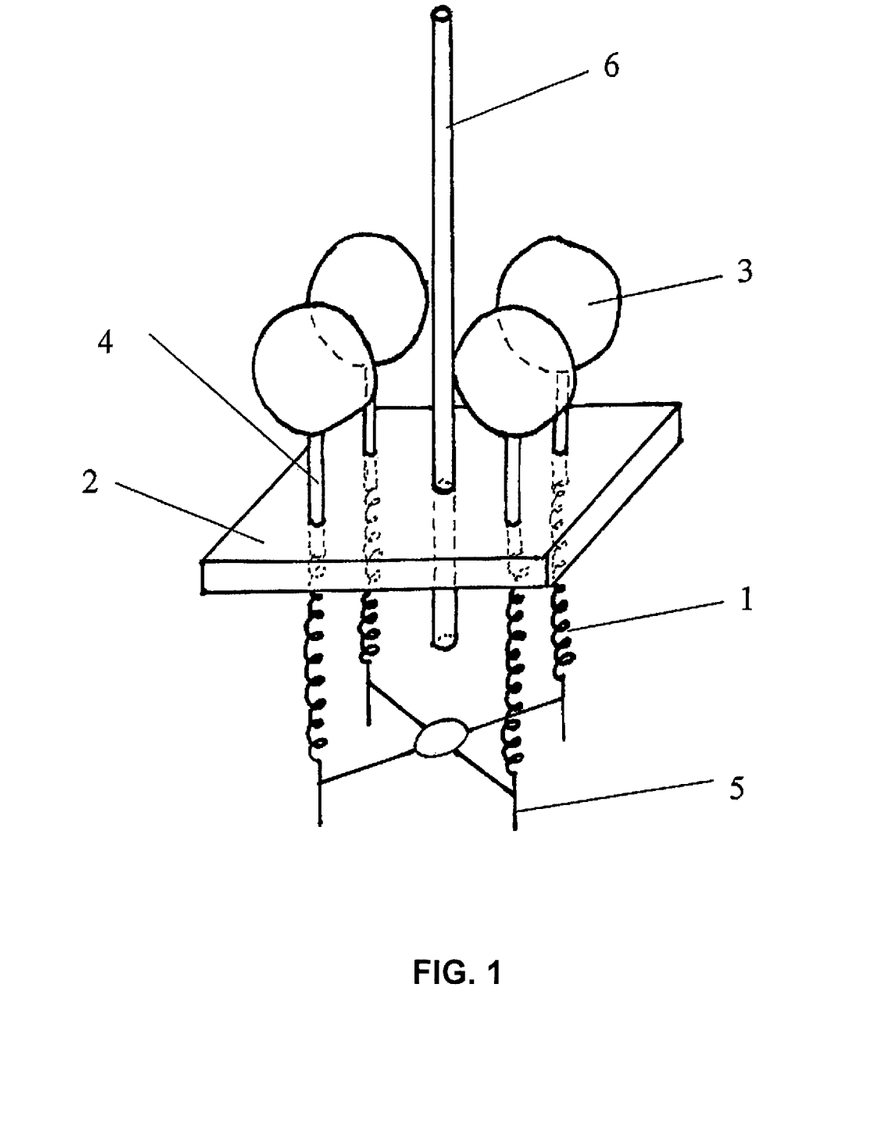
FIG. 1 is a perspective view of a basic structure in the present patent application.

In FIG. 1, an iron plate or a weight plate (2) is disposed on memory springs (1) which are downwardly compressed under the action of the gravitational force (gravity), while the upper parts of the memory springs are connected with polyhedral glass balls (3) through metal rods (4), so that the heat is focused on the metal rods (4) by the polyhedral glass balls (3) and conducted to the memory springs (1) to make the memory springs (1) upwardly bounce and return to their original shapes. The lower parts of the memory springs (1) are connected with heat-conducting rods (5). The heat is conducted to memory springs (1) via the heat-conducting rods (5) and thereby makes the memory springs (1) return to their original shapes in other ways. A driving stem (6), which is used as a stem to drive other machines to rotate or move up and down and used for pressing a timer switch (13), is disposed on the center of the iron plate or the weight plate (2).

Figure 2:
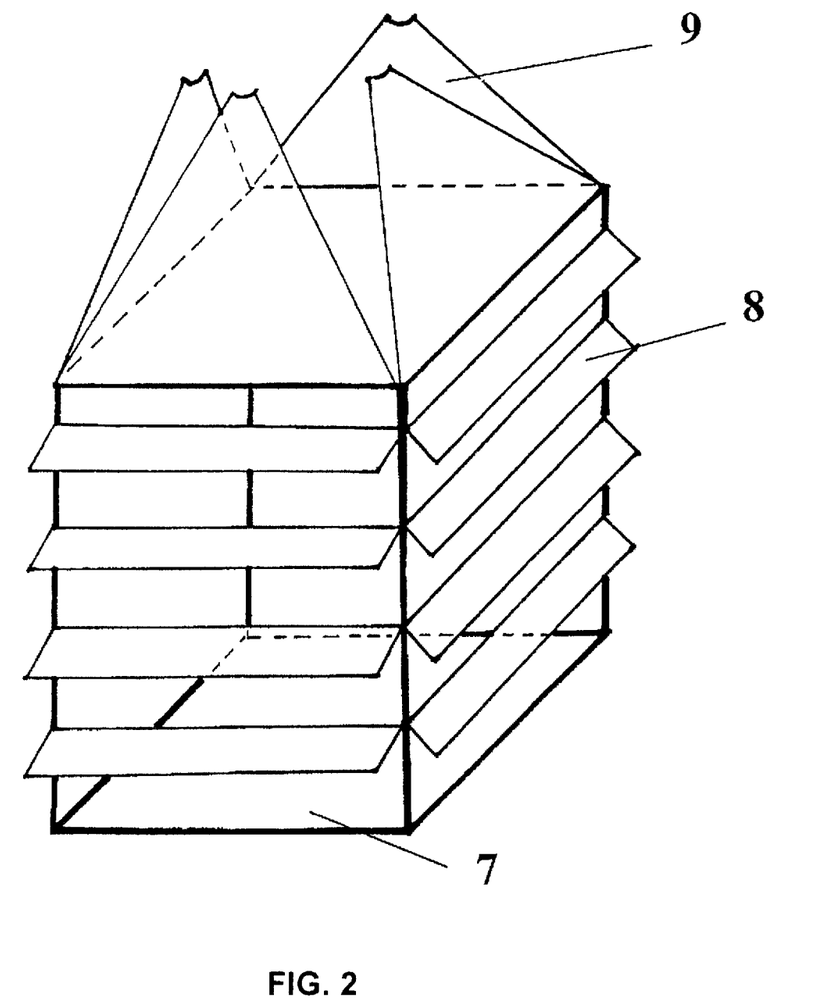
FIG. 2 is a perspective view of a heat-insulating box in the present patent application.

In FIG. 2, the four edges of a heat-insulating box (7) are provided with blinds (8), which are used for preventing the sunshine entering the inside of the heat-insulating box when the box is lifted. The blinds have opening gaps thereon for diffusing hot air out of the box. Triangular box covers (9) are arranged on the heat-insulating box (7). When the memory springs (1) are compressed by the iron plates or the weight plates thereon, the box cover (9) is positioned at a lower position and being perpendicular between 10 degrees to 20 degrees; when the memory springs (1) are heated to return to their original shapes and lifting up the box, the box cover (9) is positioned at a higher position and being completely closed and perpendicular between 40 degrees to 50 degrees. Simultaneously, the hot air in the box starts to be diffused out. The blinds (8) and the surfaces of the box covers (9) can be glued with heat-insulating tiles which are made of amorphous silicon reinforced fiber and high-temperature ceramic coating or any other materials to enhance heat-insulating capability.

Figure 3:
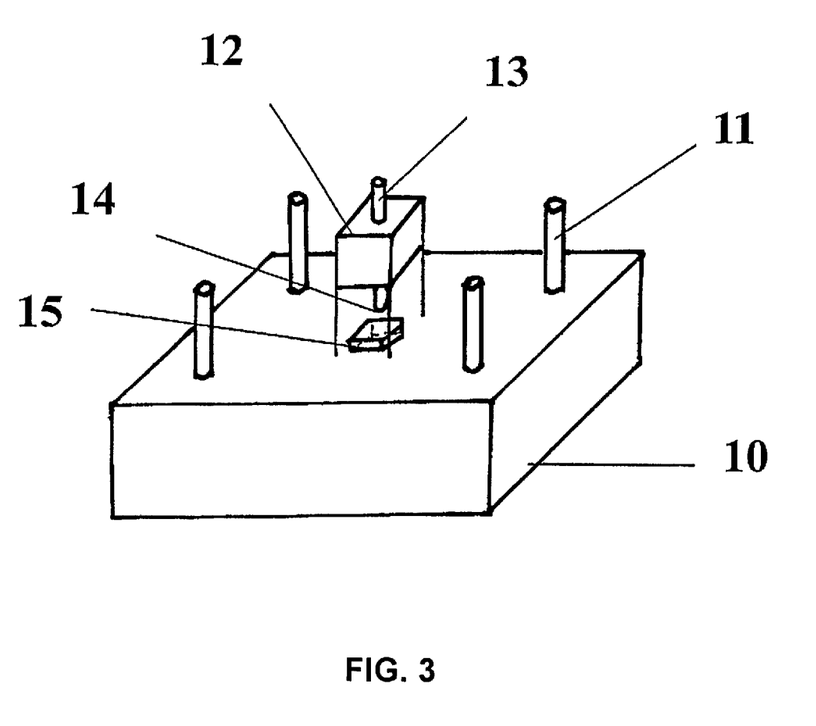
FIG. 3 is a perspective view of a heater in the present patent application.

In FIG. 3, a heater (10) may be a fuel tank, an electric furnace or a geo-heat reservoir. The heater is provided with a plurality of burner nozzles or heat-conducting cylinders (11) which are just tightly engaged with the heat-conducting rods (5). The center of the heater (10) is provided with a heater switch (15), above which a timer (12) is arranged. When the memory springs (1) are compressed by the iron plate or the weight plate (2) thereon, the driving stem (6) compresses a timer switch (13) to make the timer (12) start counting; when the memory springs (1) are heated to return to their original shapes and lifting up the driving stem (6), the driving stem (6) departs from the timer switch (13) to stop the timer (12) from counting. When the timer (12) starts to work and reaches a scheduled time, a timer driving stem (14) downwardly compresses the heater switch (15) so that the heater (10) heats the heat-conducting stem (5) via the burner nozzles or the heat-conducting cylinders (11), thereby making the memory springs (1) return to their original shapes.

Figure 4:
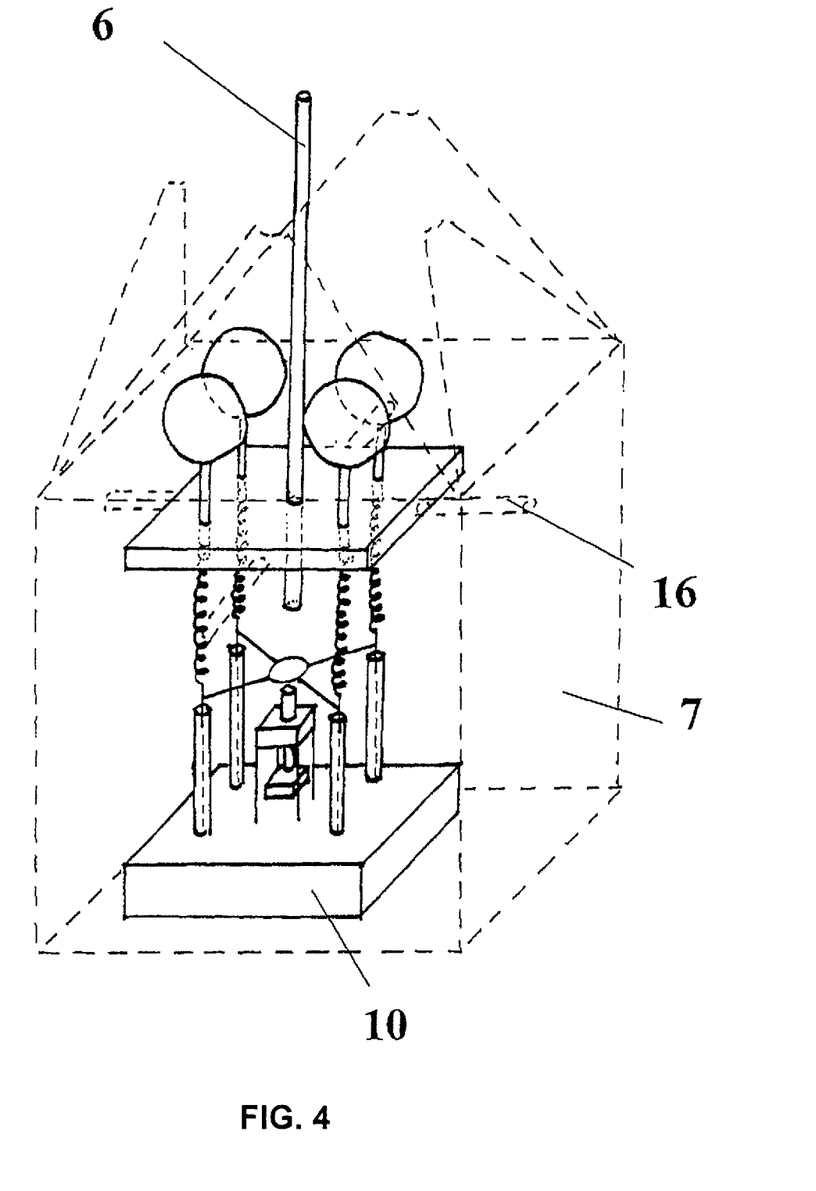
FIG. 4 is a perspective assembly view of the present patent application.

In FIG. 4, a connecting rod (16) for connecting the weight plate (2) with the box is configured for driving the box to move up and down when the weight plate (2) moves up and down.

Figure 5:
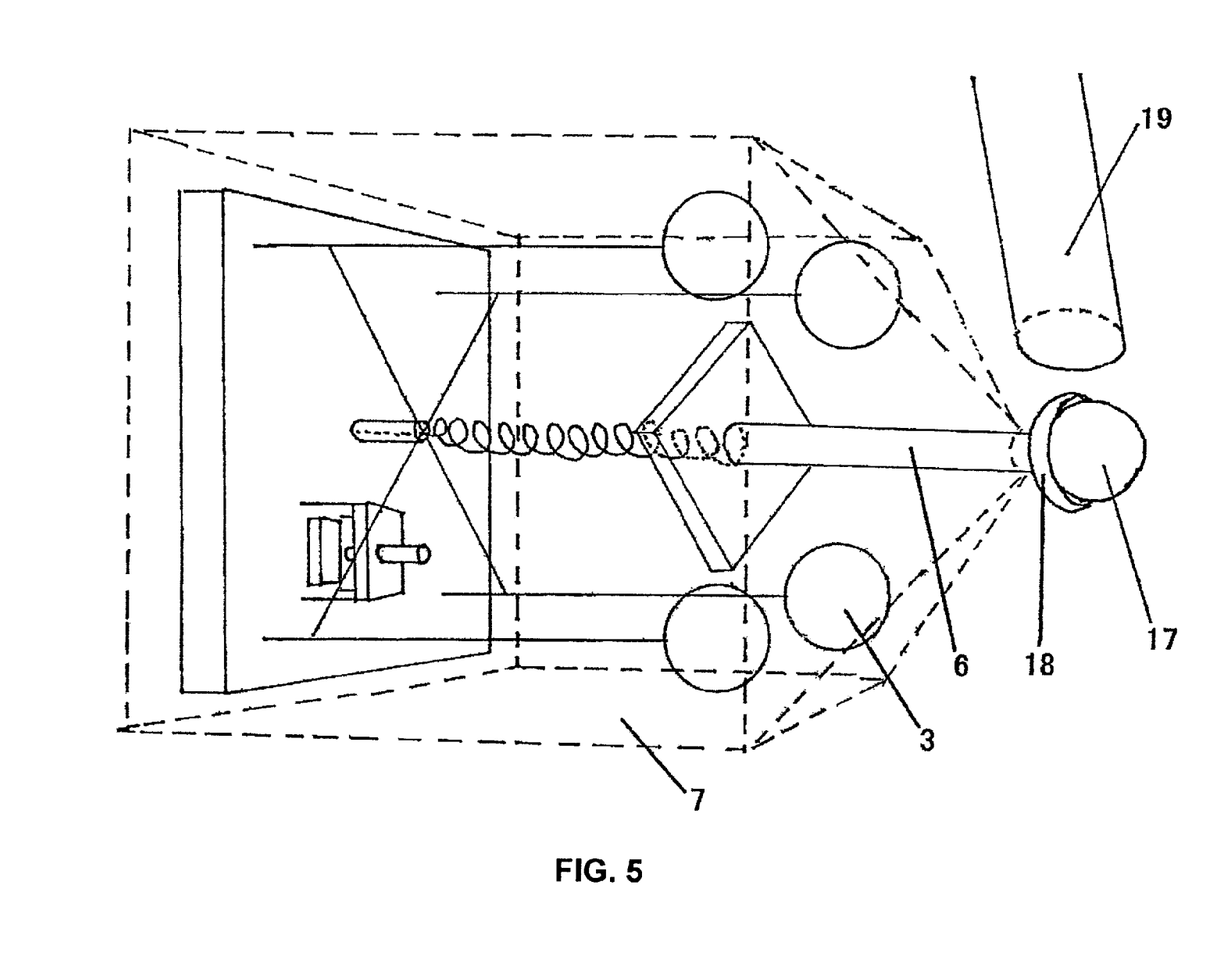
FIG. 5 is an illustrative view of an electricity-generating structure in the present patent application.

In FIG. 5, a steel ball tray (18) supporting a steel ball (17) is configured for fixing the steel ball (17) and rolling the steel ball (17) to a ball-entering pipe (19) by the method of turning the steel ball tray (18) one side up and one side down when the steel ball is at a highest position.

Figure 6:
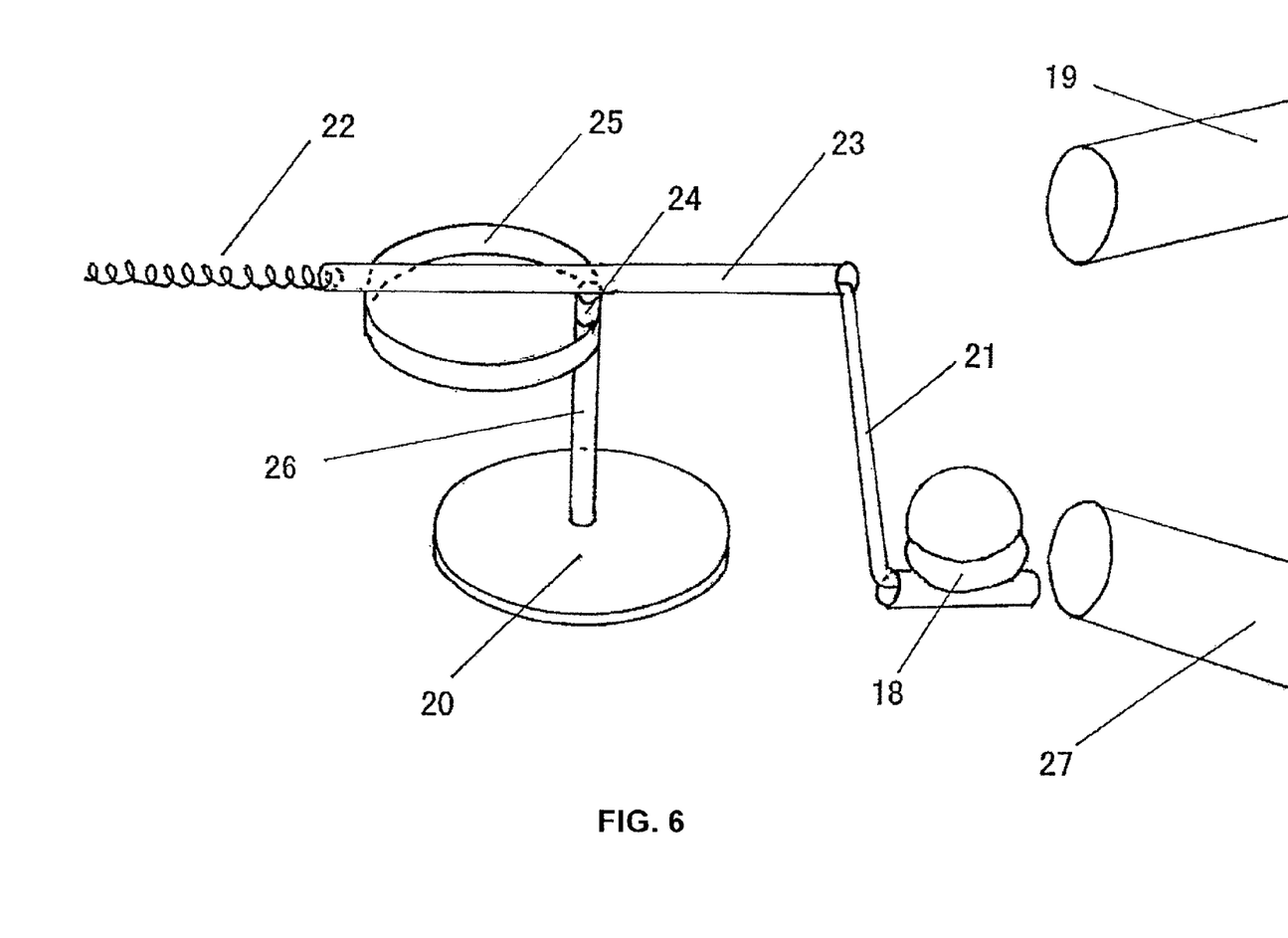
FIG. 6 is an illustrative view showing a partial structure of an electricity-generating portion in the present patent application.

In FIG. 6, the steel ball (17) rolls into the steel ball tray (18) through the ball-entering pipe (19), which leads to an electricity-generating device, and downwardly pulls a chain belt (21). The chain belt (21) tightly pulls a tension spring (22). A positioning pipe (23) is arranged on the tension spring (22), and the center part of the chain belt (21) is assembled with a chain belt gear (24), which is stuck at the middle of a revolving track ring (25). When the chain belt (21) is downwardly pulled by the steel ball (17), simultaneously, the tension spring (22) is pulled away and the gear (24) is driven to revolve and rotate along the revolving track ring (25). The lower part of the gear (24) is provided with a bearing rod (26) under which a copper sheet (20) is provided. When the gear (24) rotates, the copper sheet (20) is driven to rotate simultaneously. When the chain belt (21) is pulled at the lowest position by the steel ball (17), the steel ball (17) rolls back to the engine again by the method of turning the steel ball tray (18) one side up and one side down through the ball-returning pipe (27) which leads to the engine. When the steel ball (17) departs from the steel ball tray (18), the tension spring (22) pulls the gear (24) back to the original position.

Figure 7:
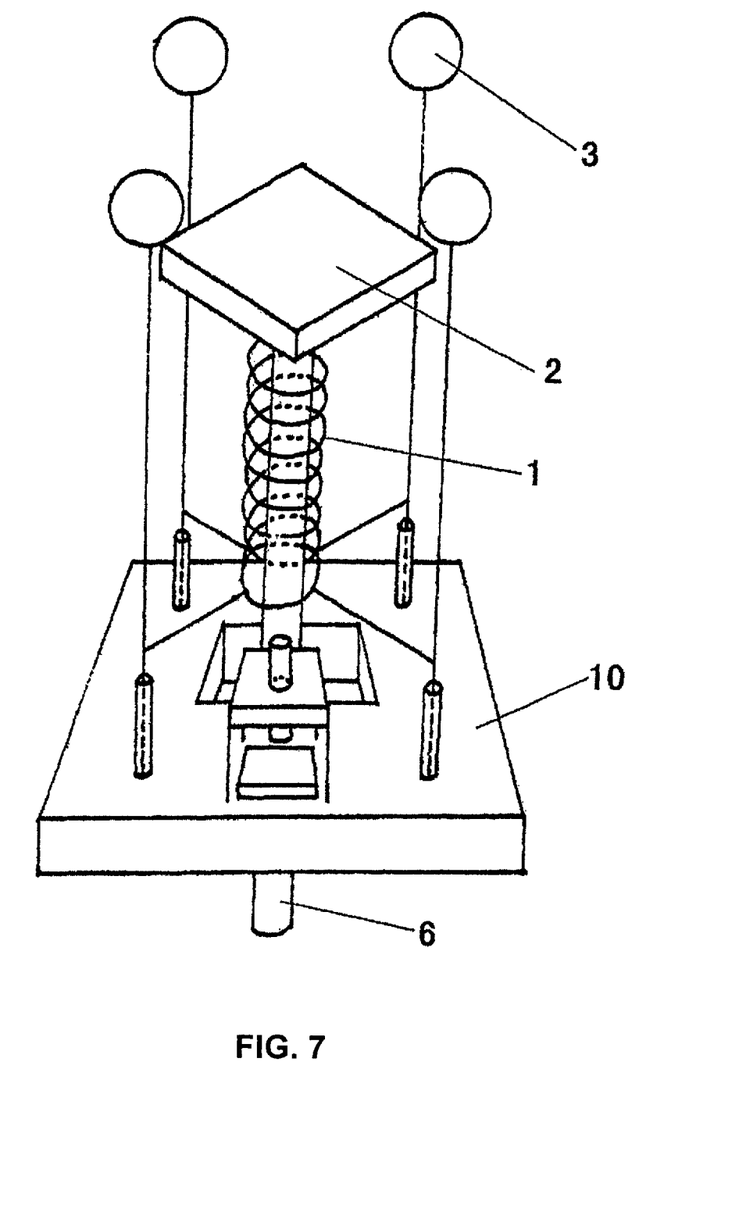
FIG. 7 is a perspective view of a basic structure in the present patent application.

In FIG. 7, the connection portion of the driving stem (6) is arranged at a lower position, which can be connected with an electricity generator conveniently.

Figure 8:
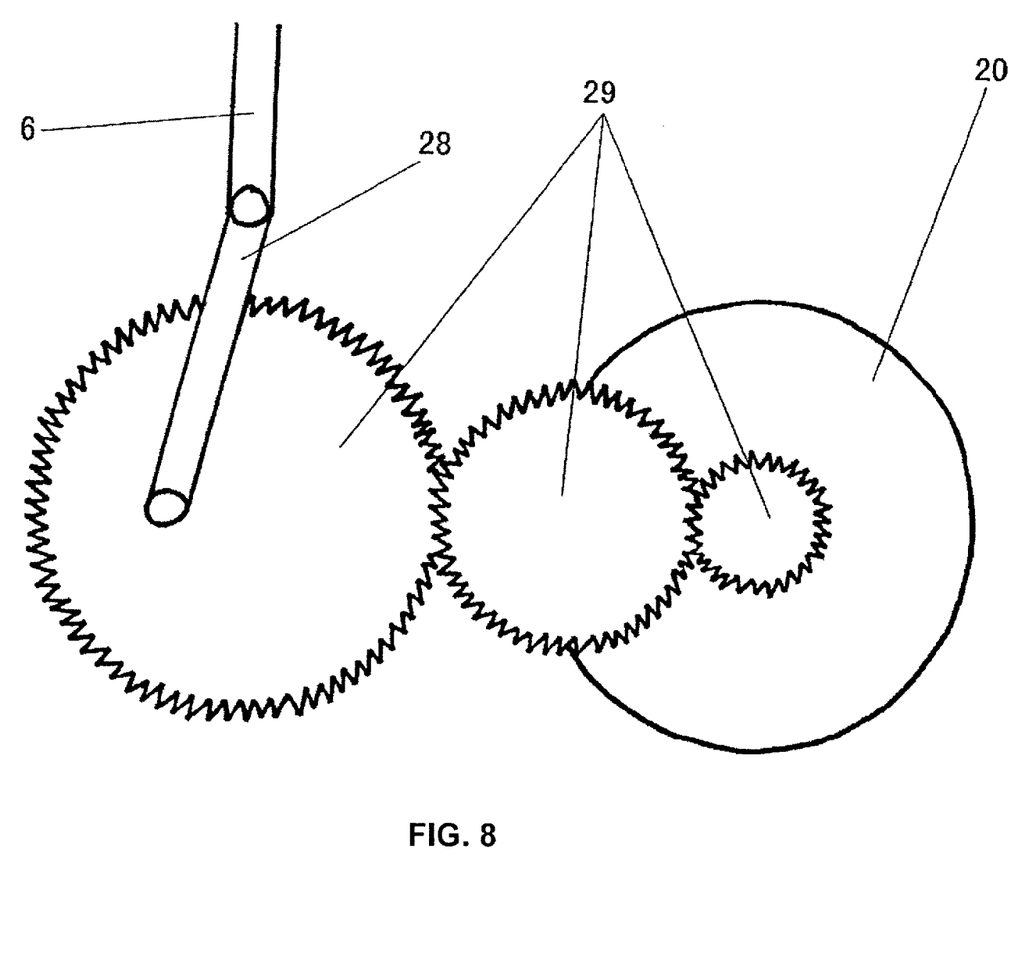
FIG. 8 is an illustrative view showing a partial structure of an electricity-generating portion in the present patent application.

In FIG. 8, when the driving stem (6) moves up and down, a pivoted lever (28) is driven to round rotate, thereby causing a main gear and a pinion gear (29) connected therewith to rotate. The pinion gear is tightly locked with the circular copper sheet (20).

Figure 9:
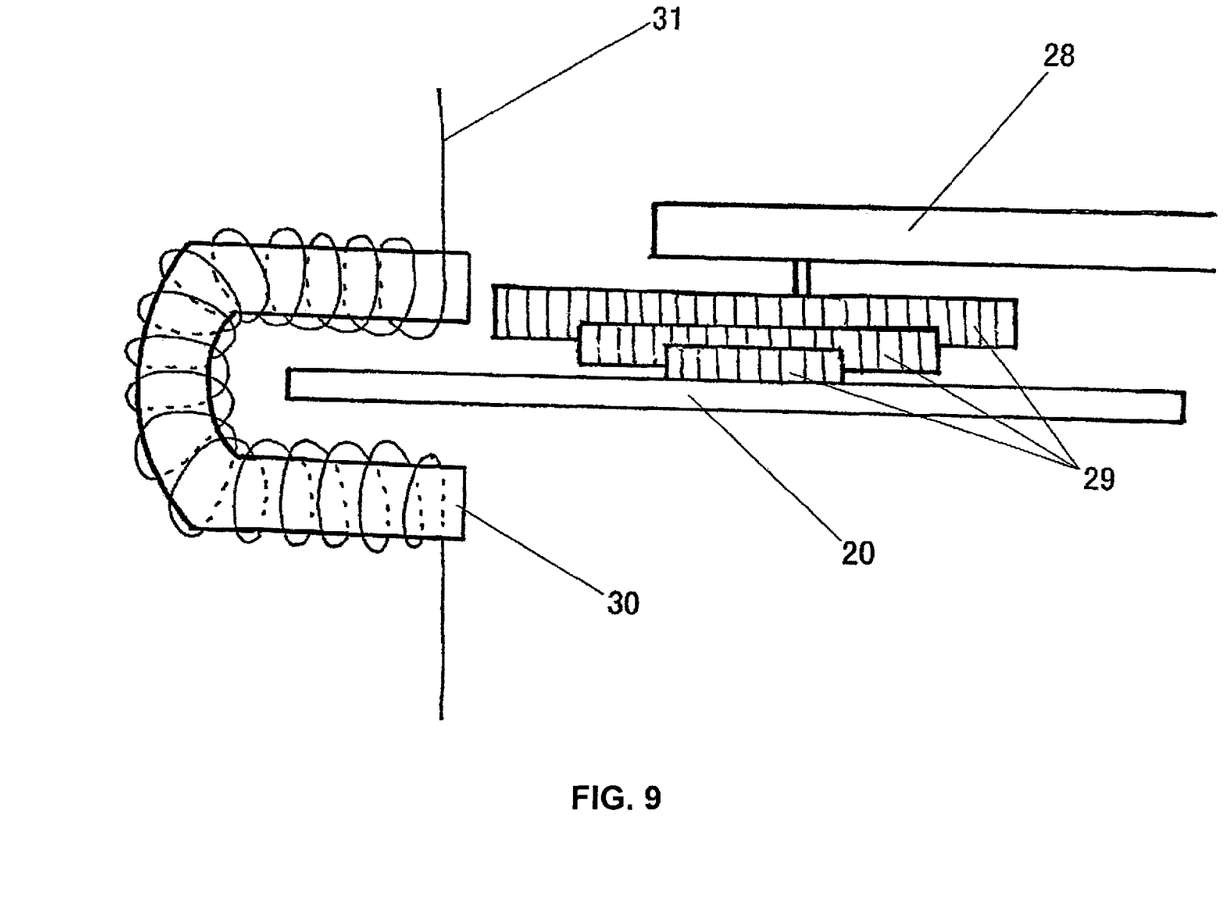
FIG. 9 is an illustrative view showing a partial structure of an electricity-generating portion in the present patent application.

In FIG. 9, the circular copper sheet (20) is in close proximity of a U-shaped magnet (30) around which a copper wire (31) is winded. When the circular copper sheet (20) rotates to cut the magnetic lines of force, electric charge is generated and so is electric current while the copper wire (31) functions as a media.

What is claimed is:

1. A memory alloy spring engine comprising:
   a memory spring made from a memory alloy;
   a driving stem connected to the memory spring; and
   a polyhedral glass ball connected to the memory spring, the polyhedral glass ball being configured to collect sunlight from different angles and conduct solar heat to the memory spring,
   wherein the memory spring is configured to perform continuous repeating cycles so as to move the driving stem up and down along therewith, during the continuous repeating cycles the memory spring is configured to
     move the driving stem when the memory spring is compressed and deformed by an external force,
     restore to an original shape after being compressed and then heated by the solar heat conducted from the polyhedral glass ball, and
     move the driving stem again after being cooled and then compressed and deformed again.

2. The memory alloy spring engine of claim 1, further comprising:
   a pivoted lever connected to the driving stem;
   a gear set connected to the pivoted lever;
   a magnet;
   a conducting wire disposed around the magnet;
   a copper sheet connected to the gear set and disposed between two sides of the magnet;
   a weight disposed on the memory spring, wherein the driving stem is disposed on the weight and the weight is configured to compress and deform the memory spring by the weight thereof; and
   a heat-conducting rod that connects the polyhedral glass ball and the memory spring,
   wherein the memory spring is made from nickel titanium alloy memory metal,
   wherein during the continuous repeating cycles the memory spring is configured so that when the memory spring is heated by the solar heat to restore the original shape thereof, the memory spring pushes the driving stem upwards,
   further wherein during the continuous repeating cycles, the weight is configured to compress the memory spring again after the memory spring is cooled,
   further wherein the driving stem is configured to rotate the gear set through the pivoted lever, the gear set is configured to turn the copper sheet to cut magnetic lines of force of the magnet and thereby generate an output current.

3. The memory alloy spring engine of claim 1, further comprising:
   a steel ball;
   a first steel ball tray disposed at the top of the driving stem, the first steel ball tray being configured to support and pass the steel ball;
   a second steel ball tray;
   a chain belt connected to the second steel ball tray;
   a revolving track ring;
   a gear connected to a middle portion of the chain belt,
   wherein the gear is disposed in the middle of the revolving track ring and the gear is configured to revolve and rotate along the revolving track ring;
   a magnet;
   a conducting wire disposed around the magnet;
   a copper sheet disposed between two sides of the magnet;
   a bearing rod connected with the gear, an end of the bearing rod being configured to turn the copper sheet to cut magnetic lines of force of the magnet and thereby generate an output current;
   a positioning pipe having the chain belt disposed therewithin;
   a tension spring connected with the positioning pipe;
   a ball entrance pipe; and
   a weight disposed on the memory spring, wherein the driving stem is disposed on the weight and the weight is configured to compress and deform the memory spring by the weight thereof so that the steel ball falls into the first steel ball tray at the top of the driving stem;
   a heat-conducting rod that connects the polyhedral glass ball and the memory spring,
   wherein the memory spring is made from nickel titanium alloy memory metal,
   wherein during the continuous repeating cycles the memory spring is configured so that when the memory spring is heated by the solar heat to restore the original shape thereof, the memory spring pushes the driving stem upwards so that the steel ball in the first steel ball tray at the top of the driving stem falls into an end of the ball entrance pipe and falls out from another end of the ball entrance pipe and into the second steel ball tray,
   the second steel ball tray being configured to pull the chain belt while the second steel ball tray is under the weight of the steel ball.

4. A memory alloy spring engine comprising:
   a memory spring made from a memory alloy;
   a driving stem; and
   a heat resource,
   wherein the memory spring is connected to the driving stem and configured to perform continuous repeating cycles so as to move the driving stem up and down along therewith, during the continuous repeating cycles the memory spring is configured to
     move the driving stem when the memory spring is compressed and deformed by an external force,
     restore to an original shape after being compressed and then heated, and
     move the driving stem again after being cooled and then compressed and deformed again; and a heat-insulating box covering an outside area, wherein the periphery of the heat-insulating box is provided with movable blinds, the top of the heat-insulating box is provided with a movable box cover formed by cone sheets, and the heat-insulating box is glued with heat-resistant tiles that comprise amorphous silicon reinforced fibers and high-temperature ceramic coating.

5. A memory alloy spring engine comprising:

a memory spring made from a memory alloy;

a driving stem;

wherein the memory spring is connected to the driving stem and configured to perform continuous repeating cycles so as to move the driving stem up and down along therewith, during continuous repeating cycles the memory spring is configured to move the driving stem when the memory spring is compressed and deformed by an external force, restore to an original shape after being compressed and then heated, and move the driving stem again after being cooled and then compressed and deformed again;

a timer being intermittently contacted by the driving stem and including a push stem; and a heater that is connected with the timer, the heater having a heat-conducting rod connected to the memory spring, and a switch, the heater being a fuel tank, an electric furnace or a geothermal reservoir, the heater including a burner nozzle connected with the heat-conducting rod or a heat-conducting cylinder connected with the heat-conducting rod, wherein the timer is disposed above the heater and configured to start counting when the timer is contacted by the driving stem and to stop counting when the timer is separated from the driving stem, the push stem of the timer is configured to downwardly push the switch of the heater at a predetermined timing so that the heater heats the memory spring by heating the heat-conducting rod through the burner nozzle or the heat-conducting cylinder.

* * * * *